Patented Jan. 8, 1952

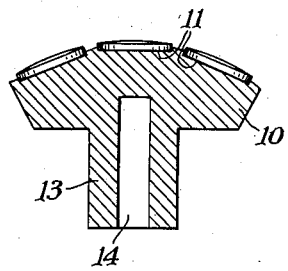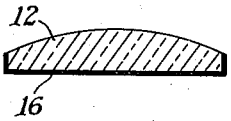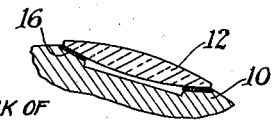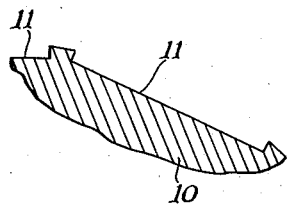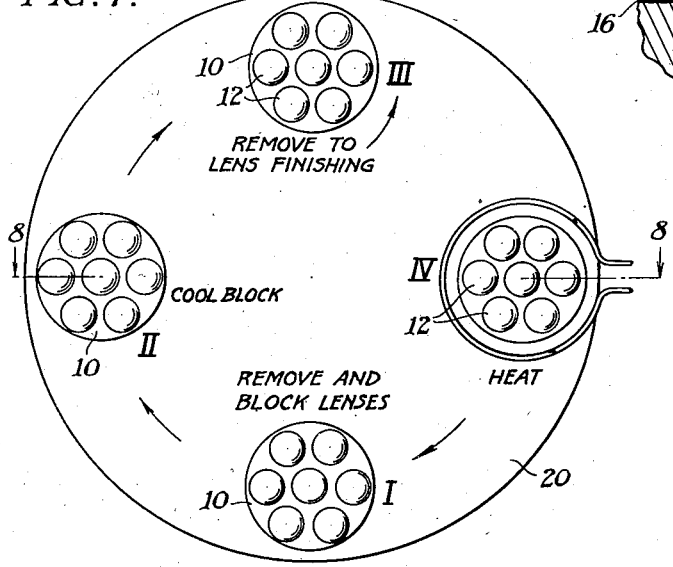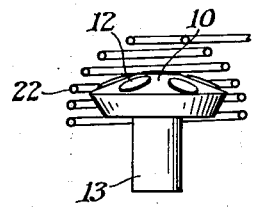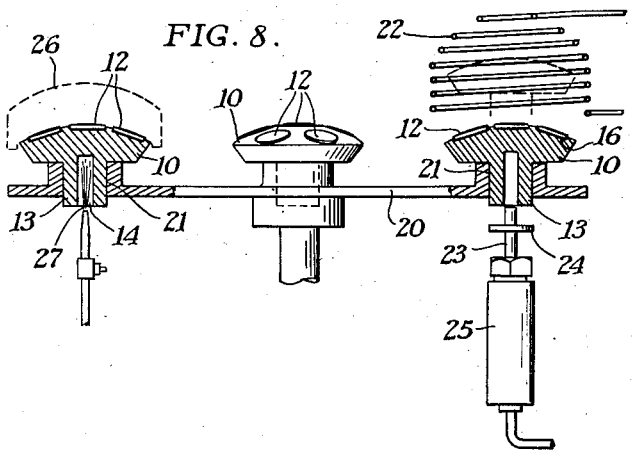

2,582,087

UNITED STATES PATENT OFFICE 2,582,087

METHOD OF BLOCKING AND UNBLOCKING LENS BLANKS FOR SURFACING OPERATIONS

John R. Turner and Rudolph W. Elliott, Rochester, N. Y., assignors to Eastman Kodak Company, Rochester, N. Y., a corporation of New Jersey Application December 8, 1948, Serial No. 64,128

6 Claims. (Cl. 51—284)

The present invention relates to the art of manufacturing optical lenses, and particularly to an improved way of blocking and unblocking the lens blanks relative to the blocking tool on which they are held for surfacing operations.

As is well known in the art, in order to carry out the surfacing of a plurality of lens blanks simultaneously, it is customary to mount the individual lens blanks in individual lens seats formed in the surface of a metal blocking tool. The blocking tool can be detachably connected to a spindle of an abrading machine to be rotated while a suitable abrading tool is oscillated over the lens blanks mounted thereon. The lens blanks are detachably mounted in the lens seats by a thermoplastic material, referred to in the art as blocking pitch or wax. The composition of the blocking pitch may vary greatly, depending upon the whims and favorite formulas of those skilled in the art, but they usually consist of an asphaltic base and may contain some shellac. These pitches, when softened by heat, permit the lens blanks to be readily seated in the lens seats, or removed therefrom, but when they have solidified upon cooling they hold the blanks rigidly in the seats of the block.

The usual practise in lens-manufacturing art is to heat the metal blocking tool on a gas stove, on an electric hotplate, or in an oven, to soften the blocking pitch in order to remove the processed lens blanks from the lens seats. The processed or surfaced lenses are removed while the blocking tool remains hot; then, more blocking pitch or wax is applied to the lens seats of the tool by a brush, or other suitable means, and new lens blanks are then fitted into the seats, after which the tool and blanks are cooled to a temperature below the flow point of the blocking pitch. It is necessary to press the lens blanks down firmly into the seats during the cooling period in order to avoid an excessively thick layer of pitch from holding the blanks away from the locating surfaces of the seats, and which would result in the blanks being ground thinner than the correct value for which the blocking tool is designed. It is necessary to clean the blocking tools frequently in order to avoid a build-up of pitch and abrasive on or between the lens seats. Such a build-up causes thin lenses, prismatic lenses, and interferes with grinding and polishing when the build-up occurs on the surface of the block between the seats. Also, the prolonged heating tends to harden the shellac used on the lenses for protecting the finished surfaces and that used in the pitches, so that the shellac and/or pitch becomes difficult to remove from both the blocks and the lens blanks.

The present invention is to provide a new method of blocking and unblocking lens blanks relative to the seats on blocking tools which eliminates all of the above-noted disadvantages and difficulties of the conventional method.

Another object of the present invention is to provide a method of blocking lenses which involves applying the blocking pitch to the lens blank rather than directly to the blocking tool, involves the use of only enough pitch to hold the lens blanks in their seats and no more, and insures the blocking pitch being confined to the areas desired, so that there is no tendency for a build-up of pitch on the surface of the blocking tool between the lens seats.

And yet another object is to provide a method of unblocking lenses which insures that the pitch is stripped from the lens seats by the lens blanks when they are removed therefrom, leaving an insignificant residue of pitch on the block.

Another object is to provide a method of unblocking lenses which involves heating the block to the melting point of the pitch while maintaining the lens blank relatively cool, whereby the pitch will stick to the lens blank and be pulled cleanly from the block when the lens is lifted from its seat.

A further object is to heat the blocking tool by electrical induction heating whereby the metal tool may be rapidly heated without heating the lens blanks because of the fact that glass is a non-conductor of electricity.

And still another object is to use an electrical induction heating apparatus for heating the block which operates at such a high frequency that the block is given a skin heating rather than heating the entire mass of the block. This results in a very rapid heating of the lens seats to release the layer of pitch contacting the same, and eliminates the necessity of cooling the pitch to set the same and holding the lenses in the seats during this time, because as soon as the block is removed from the induction field the heat in the skin portion of the block is immediately conducted to the other parts of the body of the block and the temperature of the seats drops fairly rapidly to a temperature where the pitch starts to set up, or solidify.

And another object is to provide a method of blocking and unblocking lenses which consists of a series of operations which can be conveniently set up on a rotary fixture with automatic or semi-automatic controls.

The novel features that we consider characteristic of our invention are set forth with particularity in the appended claims. The invention itself, however, both as to its organization and its methods of operation, together with additional objects and advantages thereof, will best be understood from the following description of specific embodiments when read in connection with the accompanying drawings, in which Fig. 1 is a vertical sectional view of a typical lens-blocking tool with a plurality of lenses blocked in seats in the surface thereof for a surfacing operation;

Fig. 2 is a sectional view of a typical form of lens blank which it might be desired to block for surfacing of the curved or convex surface;

Fig. 3 shows how the lens blank of Fig. 2 would be precoated according to our invention prior to the blocking thereof;

Fig. 4 is a partial sectional view of a blocking tool and showing the form of seat in the face thereof for engaging the plano face of the lens blank of Figs. 2 and 3;

Fig. 5 is a sectional detail showing means for lifting the lens blank from the lens seats after the surfacing operation;

Fig. 6 is a sectional detail showing how the lens seat in a blocking tool might be formed to engage a convex surface on a lens blank and showing such a lens block therein;

Fig. 7 is a plan view of a fixture capable of carrying out the sequence of operations according to the present invention in an automatic manner;

Fig. 8 is a vertical section taken substantially on line 8—8 of Fig. 7; and

Fig. 9 is a detailed view partly in elevation and partly in section showing the block of lenses in the induction coil of an electrical induction heating apparatus for heating the block in the unblocking operation.

Like reference characters refer to corresponding parts throughout the drawings.

In general, the present invention consists in precoating the lens blanks with just a sufficient layer of pitch, or wax, to accomplish the necessary adhesion to the lens seats in the metal blocking tool. This precoating step may be done by spraying a group of blanks with a commercial spray gun, using a solution of pitch in a volatile solvent, or using a special spray gun which applies the pitch as a molten spray which solidifies upon striking the lens blank, which may or may not be warmed, as desired. For the blocking operation, the metal blocking tool is heated in any suitable manner to a temperature substantially equal to, or slightly above, the melting temperature of the pitch, and while the block is at this temperature, the precoated lens blanks are placed in the lens seats. The pitch coating on the blanks will be melted by the heat of the block, and the blanks are pressed into the seats until properly located therein. They are held in this condition until the pitch cools and sets to adhesively locate the blanks in the lens seats. While any form of heating means may be used to heat the tool for the blocking operation, we find it desirable to do it by electrical induction, because it can be done rapidly in this manner, and this form of heating is preferred for the unblocking operation as will be set forth hereinafter.

After the surfacing operation of the lens blanks is completed, the block of lens is heated in such a way that the blocking tool is raised to substantially the melting temperature of the pitch, while the lens blanks remain relatively cool and below this melting temperature. A convenient way of doing this is to place the block of lenses in the heating coil of a conventional electrical induction heating apparatus. The blocking tool, being metal, will be readily heated by electrical induction, but the lens blanks, being glass, will not be heated by induction but only by conduction from the block to themselves. Since the metal blocking tool can be heated rapidly by electrical induction, the time depending upon the frequency employed in the heating apparatus, the kind of metal used in the block, the size and shape of both the block and the heating coil, etc., the blocking tool can be brought to the desired melting temperature of the pitch while the lens blanks will remain substantially cooler because the conduction of heat from the block to the lens blanks lags behind the heating of the block. This desired temperature gradient is also aided by the fact that the layer of pitch between the seats of the blocking tool and the lens blanks acts, to some extent, as an insulating medium.

As soon as the blocking tool has reached the desired temperature, it is removed from the induction heating coil and the lens blanks are immediately removed from the lens seats. Because the layer of pitch immediately in contact with the blocking tool has been melted, while that immediately contacting the lens blanks has not, the pitch will adhere to the blanks and be stripped from the blocking tool with the blanks, thus leaving an insignificant residue. After the processed lenses are removed from the lens seats, and while the blocking tool is still hot enough to melt pitch, a new group of precoated lens blanks may be placed in the seats for the surfacing operation. By immediately blocking a new group of lens blanks as a processed group is unblocked, it is possible to carry out both the blocking and unblocking operations with one heating operation. The mass of the blocking tools is generally sufficient to hold the heat long enough to permit the unblocking of one set of lenses and the blocking of another before the temperature of the block drops below that necessary to melt the pitch on the new set of lenses being blocked.

We will now describe our invention in connection with the accompanying drawings to show how the sequence of operations is conveniently adapted to a rotary fixture with automatic controls so that a plurality of blocks of lenses can be handled simultaneously and one operator can block and unblock lenses fast enough to keep a plurality of surfacing machines busy. In Fig. 1 is shown a conventional form of metal blocking tool 10, the curved surface of which is provided with a plurality of lens seats 11 into which lens blanks 12 are adapted to be seated. This blocking tool has a shank 13 provided with a bore 14 which is adapted to be slipped into driving engagement with the rotatable spindle of an abrading machine where the block is rotated while an abrading tool oscillates over the exposed lens surfaces, as is well known in the art. As those skilled in the art are aware, the curved surface of the blocking tool is formed to suit the curvature of the surface desired on the lens blanks and the seats are formed to properly seat the opposing surface of the lens blank so as to properly position the surface to be processed.

In Fig. 1 we have shown a blocking tool adapted for seating a plano convex lens for surfacing of the convex surface and in which case the lens seat is adapted to engage the entire plano surface of the blank and a portion of the edges thereof. An enlarged lens blank of this form is shown in Fig. 2 and in Fig. 3 we have shown how the plano surface and the edge of this blank would be precoated with a thin layer 16 of blocking pitch in accordance with the present invention. In Fig. 6 we have shown how a double convex lens blank might be blocked to abrade one surface thereof, and it is noted that the lens seat in the blocking tool for this type of lens is so formed as to only engage one of the convex surfaces adjacent its edge. While it would be necessary to precoat only the edge of such a lens blank for blocking purposes, in accordance with the present invention, we find it is easier to precoat the entire surface of the lens. While such a complete precoat is not necessary to the blocking operation, it serves a useful purpose in that it provides a desirable background which facilitates examination of the surface being processed in determining when the same has approached the "test," or, in other words, has been abraded to the desired curvature.

Assuming now that the problem at hand is to process the convex surface of the plano convex lens of the type shown in Fig. 2, the first step, according to the present invention, is to precoat the plano surface and edge of a plurality of these lens blanks with just a sufficient layer of pitch to accomplish the necessary adhesion of the blank to the seats in the blocking tool. This may be accomplished by spraying a group of blanks while held in a suitable tray, or the like, or the pitch may be applied in any other desired manner. The amount of pitch required on a lens blank for a particular blocking operation will ordinarily be determined by experience and is not a critical problem. Obviously, so far as the present invention is concerned, the manner in which the lens blank is precoated is not a limitation. A properly coated lens of the type in question would appear as shown in Fig. 3 where the layer of pitch is indicated by reference numeral 16.

The next step in the blcoking of the lens blanks, according to the present invention, is the heating of the blocking tool to a temperature substantially equal to or slightly above the melting temperature of the blocking pitch. While so far as the blocking step is concerned, this heating of the block can be accomplished in any suitable manner, i. e., gas flame, oven, or electric plate, using the particular set-up disclosed in the drawings for accomplishing the complete invention, the heating means for the block is shown as an electrical induction means of which only the induction heating coil 22 is shown in Figs. 7–9. In the particular set-up of apparatus shown herein, the blocking tool is heated once for both blocking and unblocking the lenses.

Referring now to Figs. 7 and 8, one form of apparatus for conveniently carrying out our method of blocking and unblocking lenses in an automatic manner will be described. First, there is a rotatable table 20 having in quadrant relation thereon four shouldered recesses 21 into which the shank 13 of the blocking tool may be inserted to support the tool in an upright position. Suitable means, not shown, may be provided for indexing the table 90° at a time in order to move a block of lenses located thereon successively through the four stations, designated as I, II, III and IV. At station IV there is located the induction heating coil 22 of any conventional form of electrical induction heating apparatus, not shown, and this coil is of such diameter that a blocking tool may be moved up inside thereof, as shown in Fig. 9, and held there for the time necessary to heat the block to the desired temperature which is substantially the melting temperature of the blocking pitch. This time of heating will, of course, vary with the type of metal from which the blocking tool is made, the frequency cycle and voltage at which the generator of the heating apparatus is operated, the design of the coil, etc., but we have found that it can be heated to the melting point of conventional pitches in a matter of seconds. As a suitable means of raising the blocking tool from the table and into the heating coil, we have shown an air-operated piston 23, the flanged end 24 of which is adapted to engage the bore 14 in the shank of the tool. The admission of air to the cylinder 25 associated with this piston may be automatically turned on as the table is indexed to position a new block of lenses at station IV, and may be automatically cut off after the block has been held in the heating coil sufficiently long to heat the block to the desired temperature.

Assuming we are starting with an empty blocking tool and table, the operator would first place the empty block on the table at station III and then index it to station IV it would be moved into the heating coil by operation of piston 23 until the tool reaches a temperature substantially equal to that of the melting point of the blocking pitch to be used. In the meantime, another empty blocking tool would be put on the succeeding support 21 on the table at station III. Now that the block is sufficiently heated, the table is indexed to bring the heated tool to station I and the other empty tool into station IV for heating. At station I the precoated lens blanks are pressed into the lens seats 11 on the blocking tool until the pitch is melted and the blanks are properly seated. In order to hold the lens blanks firmly in place, a weighted cap 26 (see Fig. 8) may be placed on top of the lens blanks and left there until the pitch has cooled sufficiently to completely solidify.

By the time the new lenses are blocked on the tool at station I, the empty blocking tool at station IV should be heated and the table is again indexed. Now the blocking tool with the lenses thereon is moved to station II where a jet of water 27, or cold air, is directed into the bore 14 in the shank of the tool for the purpose of rapidly cooling the block to set the pitch and without cooling medium striking the lenses. At the same time the next empty block is moved to station I to have lenses blocked thereon, and another blocking tool is moved to station IV for heating.

At the next indexing of the table, the cooled block of lenses is moved to station III where it is removed to be placed on the abrading machine for processing the surface of the lens blanks. Ultimately, after the procedure has gotten under way and there are blocks of lenses coming from the abrading machine with the surfaces of the blanks finished, as a block of new lens blanks is removed at station III for processing, a block of processed lenses will be put back onto the table in its place. Then, upon indexing of the table, the block of processed lenses is moved into station IV and heated until the block reaches the melting temperature of the pitch. Now when this block of processed lenses is moved to station I, it is still up to the melting temperature of the pitch and the processed lenses are quickly removed from the lense seats by means of a suction cup 28 on the end of a line 29 connected to a source of vacuum. Inasmuch as the removal of the lens blanks from the tool consumes very little time, the block remains sufficiently hot so that a new batch of precoated lens blanks can be blocked into the seats without having to reheat the block.

By heating the block of processed lenses by electrical induction, the block rapidly reaches the melting temperature of the pitch while the lens blanks remain cool. As a result, the layer of pitch directly engaging the seat becomes fluid and releases its grip on the block while that layer directly engaging the lens blanks remains set, or at least soft, and still adheres to the lens blanks. Consequently, as the lenses are lifted from the block, the pitch adheres thereto and is cleanly stripped from the block, leaving an insignificant residue. As a result of this, the blocks require no cleaning between the blocking of different sets of lenses, and a new set can be immediately blocked after the removal of a processed set, so that the process of blocking and unblocking lenses can be speeded up and made a substantially continuous operation.

The temperature to which the blocking tools must be heated for the blocking and unblocking operations will be determined by the melting point of the particular pitch being used and which will, in turn, vary with the composition of the pitch. Also, the time necessary to heat the blocking tool to this desired temperature will vary with different conditions including the size and shape of the blocking tool, the material the tool is made of, etc. A typical blocking wax may include Burgundy wax, rosin, and shellac in various proportions, while a typical blocking pitch may include an asphaltic base material having different proportions of different solid materials added thereto to give it the desired stiffness. As a representative example of a set of conditions we have found to exist, we note the following. If a blocking pitch having a 180° melting point is used, and the blocking tool is made of cast iron, then operating the induction heating coil with a 220-V input at substantially 10,000 cycles per second, we have found the largest block normally used in lens production will heat to the melting temperature in about 50 seconds, while the smallest will be so heated in 15 seconds.

It is believed that from the above description of our invention it will be obvious to those skilled in the art how it facilitates accurate blocking of the lenses, provides for self-cleaning blocking, and permits more efficient and rapid production of lenses. The idea of precoating the lenses with pitch, rather than applying the pitch to the block, as is the conventional practise, not only insures the application of the pitch only where it is needed, but eliminates the use of excessive pitch which is conducive to a build-up of pitch and abrasive on the surface of the block between the lense seats. The idea of unblocking the lenses by heating the block to the melting point of the pitch, while maintaining the lens blanks relatively cool, results in the pitch stripping cleanly from the block, and eliminates the possibility of warping or straining lenses because of excessive heating. The desirable results obtained by this novel method of unblocking lenses would be availed of even if the conventional method of blocking were used, wherein the block is smeared with the pitch instead of the lenses being precoated with pitch and the block being left to clean.

We have found that certain advantages are obtained in the manufacture of precision lenses if the heating of the block is confined to the portion of the block adjacent its curved surface containing the lens seats instead of heating the entire mass of the block. This can be done by using a very high cycle frequency on the induction heating coil, i. e. 400,000 cycles per second on the generator to which the heating coil is connected. The use of this high frequency in the heating coil produces what is known as a skin heating effect, or, stating it another way, the outside portion of the block is so rapidly heated that it comes to the given temperature while the center of the block remains relatively cool. One advantage of this high frequency heating in lens blocking is that the heat from the outside portion of the block can dissipate into the body of the block by conduction, so that pitch of a blocked lens will more rapidly cool and set, and there will be less chance for them to change position while the pitch is setting. Furthermore, the more rapid heating of the seats during unblocking means that the lenses themselves will remain cooler and will be less subject to any deleterious effects which might emanate from their becoming heated.

While we have shown and described certain specific embodiments of our invention, we are aware that many other embodiments thereof are possible. Our invention therefore is not to be limited to the specific details of operation and construction described, but is intended to cover all embodiments coming within the scope of the appended claims.

Having thus described our invention, what we claim is new and desire to secure by Letters Patent of the United States is:

1. In the method of unblocking a lens blank from a lens seat in a metal blocking tool in which it has been held by a thermoplastic blocking pitch for a surfacing operation, the steps of heating the lens block substantially to the melting temperature of the blocking pitch while maintaining the lens blank below this temperature, and then removing the lens blank from the lens seat while this condition of relative temperature exists, whereby the pitch will strip from the block with the lens blank leaving an insignificant residue on the block.

2. In the method of unblocking a lens blank from a lens seat in a metal blocking tool in which it has been held by a thermoplastic blocking pitch for a surfacing operation, the steps of rapidly heating the lens block substantially to the melting temperature of the blocking pitch by the use of electrical induction so that the lens blank will remain below this melting temperature, and then removing the lens blank from the lens seat while this condition of relative temperatures exists, whereby the pitch will strip from the block with the lens blank leaving an insignificant residue on the block.

3. In the method of unblocking a lens blank from a lens seat in a metal blocking tool in which it has been held by a thermoplastic blocking pitch for a surfacing operation, the steps of rapidly heating the surface of said blocking tool including said lens seat to substantially the melting temperature of said pitch by the use of electrical induction heating of such frequency as to produce a skin heating effect, whereby the temperature of the lens blank remains below that of the block, and then removing the lens blank from the lens seat while this condition of relative temperatures between the lens seat and lens block exists, whereby the pitch will strip from the block with the lens blank leaving an insignificant residue on the block.

4. The method of unblocking lens blanks relative to the lens seats in a metal blocking tool and in each of which seats a lens blank is held by a thin layer of blocking pitch and then blocking other lens blanks in said seats and comprising heating that portion of the block, including said lens seats, to substantially the melting temperature of the blocking pitch while maintaining the temperature of the lens below this temperature, whereby the layer of pitch engaging each lens seat becomes melted, while that layer engaging the lens blanks does not, removing the lens blanks from the lens seats while this condition of relative temperatures between the blanks and the lens seats exists, whereby the pitch will strip from the block with each lens blank, leaving an insignificant residue on the block, precoating the surface of another set of lens blanks with a thin layer of blocking pitch just sufficient in quantity to accomplish the adhesion of the blank to the lens seats, while the block is still hot from the unblocking operation, pressing the pitch-coated surface of the second-mentioned lens blanks into said lens seats until the blanks are properly seated therein, and holding said blanks in position in said seats until the pitch is sufficiently set to hold the same in position.

5. The method of unblocking a lens blank relative to the lens seat in a metal blocking tool wherein it is held by a thin layer of blocking pitch and then blocking another lens blank in said seat and comprising rapidly heating the lens block to substantially the melting temperature of the pitch by electrical induction heating so that the lens blank, and the strata of pitch engaging the same, will remain cool relative to the block and below the melting temperature of said pitch, removing the lens blank from the lens seat while this condition of relative temperatures exists, whereby the pitch will strip from the block with the lens blank, leaving an insignificant residue on the block, precoating the surface of another lens blank with a thin layer of blocking pitch just sufficient in quantity to accomplish the adhesion of the blank to the lens seat, and while the block is still hot from the unblocking operation, pressing the precoated surface of the second lens blank into said lens seat until the blank is properly seated therein.

6. A method of unblocking and blocking a lens blank according to claim 10, characterized by the fact that the induction heating of the block is carried out using a cycle frequency so high that only a skin heating effect of the block is accomplished, whereby the strata of pitch between the block and lens blank is rapidly heated to the melting temperature of the same for unblocking purposes, and the heat in the skin portion of the block dissipates into the body of the block by conduction after it is removed from the induction field, whereby the pitch of a subsequently blocked lens blank is cooled to a setting temperature fairly fast, thus eliminating a separate step.

JOHN R. TURNER.
RUDOLPH W. ELLIOTT.

REFERENCES CITED

The following references are of record in the file of this patent:

UNITED STATES PATENTS

| Number | Name | Date |
| --- | --- | --- |
| 1,331,480 | Boerner | Feb. 24, 1920 |
| 1,332,778 | Taylor et al. | Mar. 2, 1920 |
| 1,456,673 | Dey | May 29, 1923 |
| 2,224,168 | Tillyer et al. | Dec. 10, 1940 |
| 2,291,862 | Bailey | Aug. 4, 1942 |
| 2,432,491 | Thomas | Dec. 9, 1947 |
| 2,462,072 | Darmara | Feb. 22, 1949 |

FOREIGN PATENTS

| Number | Country | Date |
| --- | --- | --- |
| 460,049 | France | Sept. 24, 1913 |